United States Patent [19]
Hahner

[11] 3,840,022
[45] Oct. 8, 1974

[54] COMBINE BLOWER
[75] Inventor: Wolfgang Hahner, Einod, Germany
[73] Assignee: Deere & Company, Moline, Ill.
[22] Filed: Apr. 9, 1973
[21] Appl. No.: 349,617

[30] Foreign Application Priority Data
May 16, 1972 Germany.......................... 2223784

[52] U.S. Cl.............................. 130/21, 130/27 HF
[51] Int. Cl. ........................................... A01f 12/48
[58] Field of Search....... 130/21, 27 R, 27 HF, 27 E

[56] References Cited
UNITED STATES PATENTS
| | | | |
|---|---|---|---|
| 925,002 | 6/1909 | Leonard................................ | 130/21 |
| 926,201 | 6/1909 | Lytle..................................... | 130/21 |

Primary Examiner—Antonio F. Guida

[57] ABSTRACT

A combine has a main separator body with opposite sidewalls and an improved blower mounted in the body for delivering an air blast to a cleaning mechanism in the body. The blower includes a main, axially transverse, drum-type, centrifugal blower extending between a pair of upright interior walls between the opposite sidewalls, the interior walls having air inlets at the opposite axial ends of the main blower, which delivers air in a generally tangential direction over part of the width of the body. A pair of auxiliary, drum-type, centrifugal blowers are mounted on a common shaft parallel to the main blower shaft respectively between the interior walls and the sidewalls, the opposite sidewalls having air inlet openings adjacent the outer axial ends of the blowers to provide air inlets for the auxiliary blowers, which deliver air in a tangential direction on opposite sides of the main blower delivery, so that the main and auxiliary blowers deliver a uniform airstream that spans the entire width of the combine body.

7 Claims, 3 Drawing Figures

COMBINE BLOWER

BACKGROUND OF THE INVENTION

This invention relates to a harvesting machine, and more particularly to an improved blower for the cleaning mechanism in a combine or the like.

A combine conventionally includes an axially transverse, centrifugal-type blower that spans the width of the main separator body below the separating mechanism, the blower conventionally taking air in at its opposite axial ends and directing a tangential blast of air upwardly and rearwardly through the cleaning mechanism to blow the chaff and the like out the rear of the combine while permitting the heavier grain to drop into a collecting mechanism. A typical blower of this type is shown in U.S. Pat. No. 3,412,735, also assigned to the assignee herein. It is obviously important that the blast of air be substantially uniform across the width of the cleaning mechanism to provide uniform cleaning action for the grain, regardless of its lateral location as it passes through the cleaning mechanism.

However, with the newer, larger capacity, wider machines, a problem has arisen with conventional blowers, since the air inlets are at the opposite ends of the blower, the supply of air varies across the width, giving an uneven air blast distribution.

One method of solving the problem is disclosed in U.S. Pat. No. 3,469,773, where the conventional air intake system is altered to provide a more even air intake across the width of the fan.

SUMMARY OF THE INVENTION

According to the present invention, there is provided an improved blower means for providing a uniform distribution of air across the width of the relatively wide combine cleaning mechanism utilizing centrifugal blowers with axial end air intakes. More specifically, there is provided an improved blower means utilizing a main, central, centrifugal blower having air inlets at its opposite ends and spanning less than the width of the separating mechanism and auxiliary blower means parallel and offset from the main blower for delivering air across the rest of the width of the separating mechanism, so that the main blower means and the auxiliary blower means conjunctively furnish a relatively uniform air blast across the width of the separating mechanism.

Still more specifically, a pair of centrifugal, drum-type blowers are provided adjacent the opposite ends of the main blower, the auxiliary blowers having air intakes in the combine sidewalls rearwardly of the air intakes of the main blower.

Another feature of the invention resides in the matching of the widths and diameters of the auxiliary blowers with the width and diameter of the main blower to provide a uniform air flow.

DESCRIPTION OF THE PREFERRED EMBODIMENT

Figure 1:
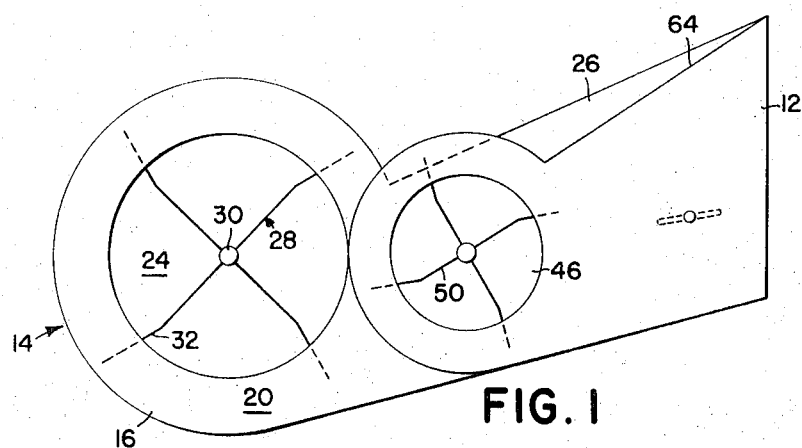
FIG. 1 is a somewhat schematic, side elevation view of a blower system embodying the invention.
Figure 2:
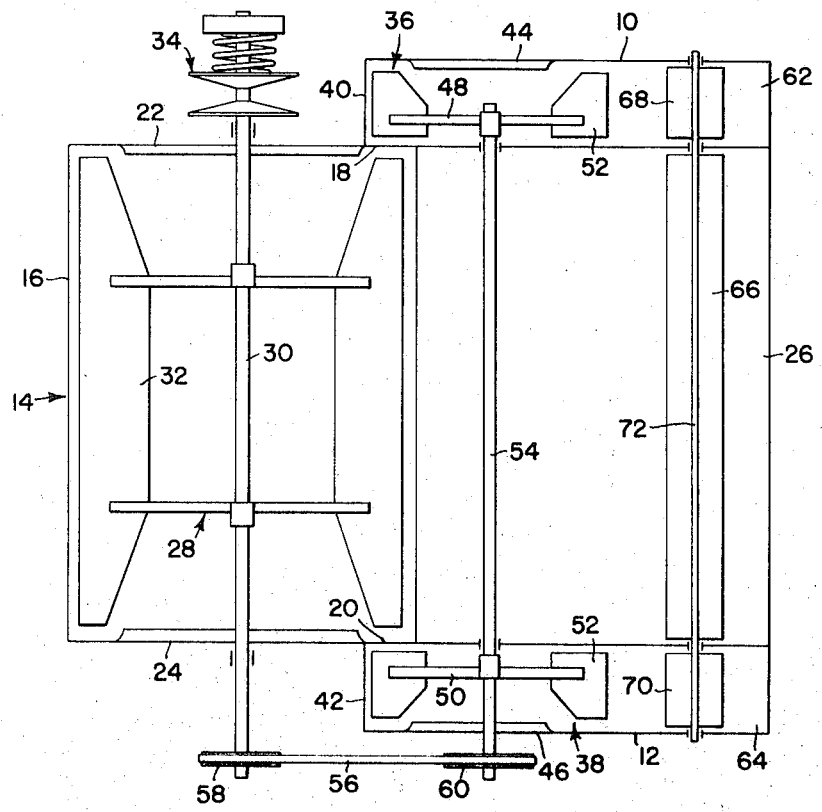
FIG. 2 is a schematic, plan view of the blower system, with the top portion of the blower housings removed to show the blowers, the auxiliary blowers being shown somewhat out of scale.
Figure 3:
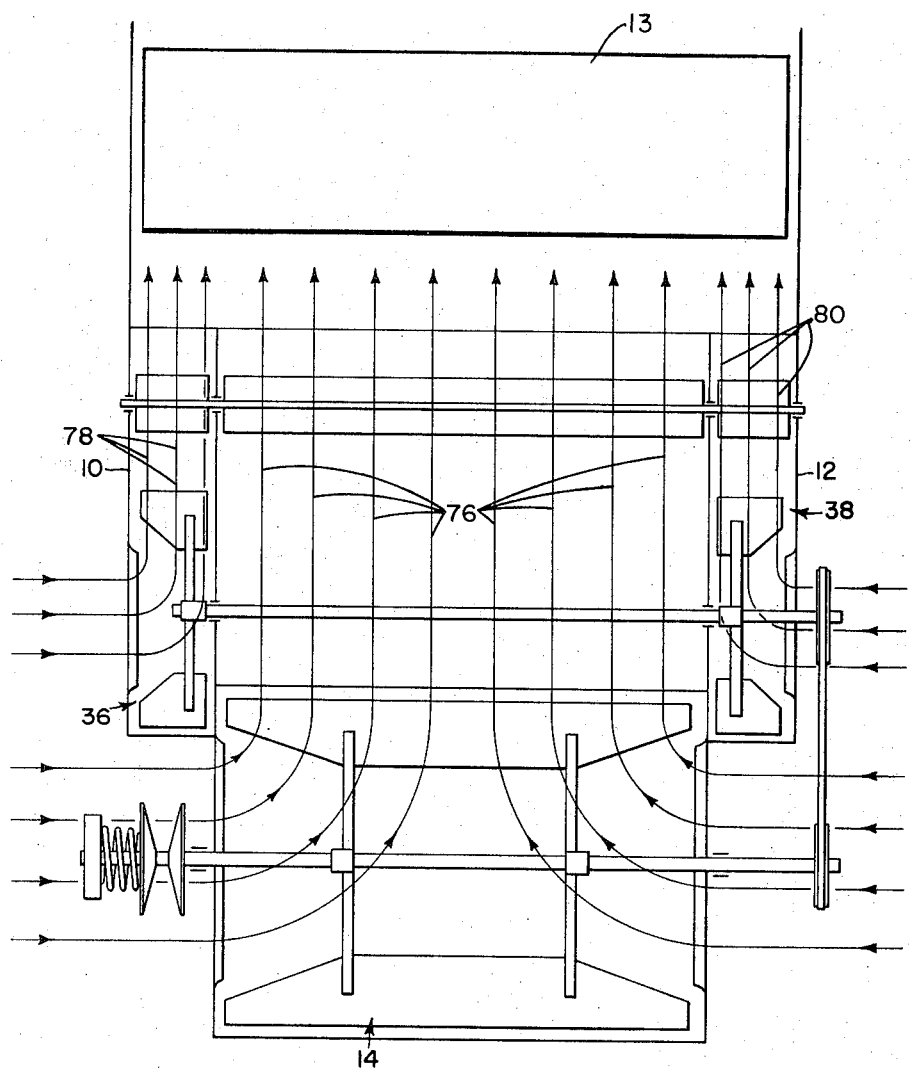
FIG. 3 is a view similar to FIG. 2, but showing the air flow patterns involved.

The invention is embodied in a blower system for a combine, such as shown in said U.S. Pat. No. 3,412,735, such combines including a main separator body having opposite, upright sidewalls, the lower portions of the opposite sidewalls being indicated by the numerals 10 and 12 in FIG. 2. As is well known, the crop-separating mechanism in the body spans the width between the opposite sidewalls and separates the grain from the straw or the like and delivers the grain to a cleaning mechanism disposed generally below the separating mechanism and also spanning the width of the separator body between the opposite sidewalls. The cleaning mechanism conventionally includes a cleaning shoe, which is schematically illustrated in FIG. 3 and indicated by the numeral 13, and a blower which delivers a blast of air through the cleaning shoe and blows the lighter material, such as the chaff, out the rear of the combine while the grain drops through the air blast onto a collecting mechanism.

The improved blower system for the cleaning mechanism includes a main, drum-type, centrifugal, axially transverse main blower, indicated generally by the numeral 14. The main blower includes a generally cylindrical housing 16 having opposite upright sidewalls 18 and 20 parallel to and between the sidewalls 10 and 12. Circular air inlet openings 22 and 24 are provided in the opposite sidewalls 18 and 20, respectively, at the opposite ends of the main blower coaxial with the blower axis. The housing 16 also has a generally tangential upwardly and rearwardly inclined discharge duct 26, the discharge duct having a generally rectangular cross section with the opposite housing sidewalls 18 and 20 forming the opposite sides of the duct. The blower includes a paddle-type impeller or rotor 28 having an axial shaft 30 extending through the air inlet openings 22 and 24 and a number of radial, longitudinally extending paddles or blades 32 attached to the shaft. The impeller is driven by a conventional belt drive 34 at one end of the shaft, only the driven sheave of which is schematically illustrated.

A pair of auxiliary, drum-type, centrifugal blowers 36 and 38 are respectively disposed parallel to and on opposite sides of the main blower 14 between the sidewalls 18 and 20 of the main blower housing and the opposite sidewalls 10 and 12 of the separator body. The auxiliary blowers 36 and 38, respectively, include generally cylindrical housings 40 and 42, the opposite ends or sides of the housing 40 being formed by the sidewall 10 and the wall 18, while the opposite ends or sidewalls of the housing 42 are formed by the body sidewall 12 and the sidewall 20 of the main blower housing. The blower 36 has a circular air inlet opening 44 in the sidewall 10 and the blower 38 similarly has a circular air inlet opening 46 in the sidewall 12. The blowers 36 and 38 respectively include paddle-type impellers or rotors 48 and 50, which are formed by a number of radial, longitudinally extending paddles or blades 52 mounted on the opposite ends of the common, transverse shaft 54 extending through and journaled in the walls 18 and 20 parallel to the shaft 30. The shaft 54 is driven approximately at the same speed as the shaft 30 by a drive belt 56 trained around a drive sheave 58 on the end of the shaft 30 and a driven sheave 60 on the end of the shaft 54. The auxiliary blower housings 40 and 42 have generally tangential discharge ducts 62 and 64, respectively, the ducts 62 and 64, like the discharge duct 26, having a generally rectangular cross section and extending generally parallel and on opposite sides of the main blower discharge duct 26. A main baffle 66 spans the width of the main blower dischrge duct 26 and auxiliary baffles 68 and 70 similarly span the width of the auxiliary blower discharge ducts 62 and 64, the baffles 66, 68 and 70 being mounted on a common transverse shaft 72. As is apparent, the attitude of the baffles can be changed by rotating the shaft to vary the air blast from the blowers.

While the auxiliary blowers are schematically shown as having a substantially less axial dimension than the main blower, in the preferred embodiment, the total axial length of the auxiliary blowers combined is only a little less than the axial length of the main blower 14. For example, in the preferred embodiment, the main blower has an axial length of 900 mm. and an impeller diameter of 450 mm., while each auxiliary blower has a length of 400 mm. and an impeller diameter of 400 mm. Thus, the ratio of length to diameter for the main blower is 2, while the ratio of length to diameter for each auxiliary blower is 1. Of course, the main blower has an air inlet at each end as opposed to the single air inlet for each auxiliary blower, and the ratio for each half of the main blower served by one air inlet is similarly 1. It has been found, that with the above ratios, a substantially even air blast velocity has been achieved across the entire 1700 mm. width of the separator body. The 900 mm. width of the main blower has been found to be approximately the width in a combine for which uniform air velocity can be achieved, and when the blower widths exceed said figure, the air distribution becomes unequal. Of course, many modern combines exceed said width, and the use of the present blower system permits a uniform air flow for the newer, wider combines.

In operation, the separating mechanism separates the grain and chaff from the straw or the like and delivers the grain and chaff to the cleaning shoe 13. The main blower 14 takes in air from the opposite sides of the combine and delivers it through the central portion of the cleaning shoe, as indicated by the air flow arrows 76 in FIG. 3. The auxiliary blowers 36 and 38 respectively take in air from opposite sides of the combine and respectively deliver it through the opposite side portions of the cleaning shoe 13 on opposite sides of the main blower discharge, the air flows from the blowers 36 and 38 being indicated by the arrows 78 and 80 in FIG. 3. Thus, the air flows from the main and auxiliary blowers conjunctively span the width of the cleaning shoe 13 and separator body.

I claim:

1. In a harvesting machine having a main separator body with opposite sidewalls and a crop-cleaning mechanism mounted in the body and spanning the width between the walls, the combination therewith of improved blower means for delivering an air blast to the crop-cleaning mechanism and comprising; a first, drum-type centrifugal blower means mounted axially transversely in the body, having axial air inlet means at its opposite ends, and tangential air discharge means spanning less than the width between the sidewalls for tangentially delivering air to a portion of the width of the crop-treating mechanism; and auxiliary blower means axially parallel to the first blower means and having air inlet means for the first blower means and tangential air discharge means for delivering air in a tangential direction laterally offset from and adjacent to the first blower means air discharge means so that the first blower means and the auxiliary blower means conjunctively deliver air across the width of the crop-cleaning mechanism between the sidewalls.

2. The invention defined in claim 1 wherein the auxiliary blower means includes a pair of coaxial drum-type, centrifugal blowers respectively disposed at opposite ends of the first blower means adjacent the opposite sidewalls, each auxiliary blower having an air inlet in the adjacent sidewall.

3. The invention defined in claim 2 wherein the axial length and diameter of the auxiliary blowers are selected so that they deliver approximately the same air velocity as the first blower means to provide an approximately uniform air blast throughout the width of the crop-treating mechanism.

4. The invention defined in claim 3 wherein the first blower means includes an axial shaft and the auxiliary blowers are mounted on a common drive shaft driven from the first blower means shaft.

5. The invention defined in claim 3 wherein the combined axial length of the auxiliary blowers is less than the length of the main blower means.

6. An improved blower for a harvester crop-cleaning mechanism comprising: a first pair of upright walls; a first, drum-type, centrifugal blower disposed between said walls and having an axial shaft extending transversely between said walls, a pair of axial air inlets in the opposite walls and a tangential discharge opening extending between said walls; a pair of outer sidewalls respectively disposed parallel to and outwardly of the first walls; and a pair of drum-type, centrifugal, auxiliary blowers respectively disposed between the outer sidewalls and the first walls axially parallel to the first blower and axial air inlets in the outer sidewalls and tangential discharge openings adjacent to and on opposite sides of the first blower discharge opening so that the first blower and the axuiliary blowers conjunctively deliver air across the width of the crop cleaning mechanism.

7. The invention defined in claim 6 wherein the first blower means includes an axial shaft and the auxiliary blowers are mounted on a common drive shaft driven from the first blower means shaft.

* * * * *

UNITED STATES PATENT OFFICE
CERTIFICATE OF CORRECTION

Patent No. 3,840,022  Dated 8 October 1974

Inventor(s) Wolfgang Hahner

It is certified that error appears in the above-identified patent and that said Letters Patent are hereby corrected as shown below:

Column 4, Line 47, after "and" add --respectively having--.

Signed and sealed this 4th day of February 1975.

(SEAL)
Attest:

McCOY M. GIBSON JR.
Attesting Officer

C. MARSHALL DANN
Commissioner of Patents